United States Patent
Nebiyeloul-Kifle et al.

(10) Patent No.: US 6,611,227 B1
(45) Date of Patent: Aug. 26, 2003

(54) AUTOMOTIVE SIDE OBJECT DETECTION SENSOR BLOCKAGE DETECTION SYSTEM AND RELATED TECHNIQUES

(75) Inventors: Yonas Nebiyeloul-Kifle, Wellesley, MA (US); Walter Gordon Woodington, Lincoln, MA (US)

(73) Assignee: Raytheon Company, Lexington, MA (US)

( * ) Notice: Subject to any disclaimer, the term of this patent is extended or adjusted under 35 U.S.C. 154(b) by 0 days.

(21) Appl. No.: 10/215,278

(22) Filed: Aug. 8, 2002

(51) Int. Cl.⁷ .......................... G01S 7/40; G01S 13/93
(52) U.S. Cl. ................ 342/173; 342/70; 342/165; 342/175; 342/195; 701/300; 701/301; 180/167; 180/169
(58) Field of Search ................. 342/27, 28, 70, 342/71, 72, 165, 166–175, 195, 198, 300, 301, 302, 192, 194, 196, 197; 701/300, 301, 302; 180/167, 168, 169

(56) References Cited

U.S. PATENT DOCUMENTS

| | | |
|---|---|---|
| 3,697,985 A | 10/1972 | Faris et al. |
| 3,898,652 A | 8/1975 | Rashid |
| 3,921,749 A | 11/1975 | Kawada .................. 180/169 |
| 3,935,559 A | 1/1976 | Straffon et al. |
| 3,940,696 A | 2/1976 | Nagy |
| 3,974,501 A | 8/1976 | Ritzie |
| 3,978,481 A | 8/1976 | Angwin et al. |
| 4,003,049 A | 1/1977 | Sterzer et al. |
| 4,008,473 A | 2/1977 | Hinachi et al. |
| 4,008,475 A | 2/1977 | Johnson |
| 4,035,797 A | 7/1977 | Nagy |
| 4,079,377 A | 3/1978 | zur Heiden et al. |
| 4,143,370 A | 3/1979 | Yamanaka et al. |
| 4,217,582 A | 8/1980 | Endo et al. |
| 4,308,536 A | 12/1981 | Sims, Jr. et al. |
| 4,346,774 A | 8/1982 | Hirota et al. |
| 4,348,675 A | 9/1982 | Senzaki et al. |
| 4,349,823 A | 9/1982 | Tagami et al. |
| 4,409,899 A | 10/1983 | Owen et al. |
| 4,543,577 A | 9/1985 | Tachibana et al. |
| 4,549,181 A | 10/1985 | Tachibana et al. |
| 4,622,636 A | 11/1986 | Tachibana |
| 4,673,937 A | 6/1987 | Davis |
| 4,703,429 A | 10/1987 | Sakata |
| 4,718,558 A | 1/1988 | Castaneda |
| 4,901,083 A | 2/1990 | May et al. |
| 4,965,605 A | 10/1990 | Chang et al. |
| 4,970,653 A | 11/1990 | Kenue |
| 4,994,809 A | 2/1991 | Yung et al. |
| 5,008,678 A | 4/1991 | Herman |

(List continued on next page.)

FOREIGN PATENT DOCUMENTS

| | | |
|---|---|---|
| DE | 196 32 889 A1 | 2/1998 |
| DE | 195 23 693 A1 | 5/1998 |
| EP | 0 887 658 A1 | 12/1998 |
| FR | 2 754 604 A1 | 5/1992 |
| GB | 2 267 401 A | 6/1985 |
| WO | WO 90/02985 A1 | 3/1990 |

*Primary Examiner*—Bernarr E. Gregory
(74) *Attorney, Agent, or Firm*—Daly, Crowley & Mofford, LLP

(57) ABSTRACT

A system is provided for detecting blockage of an automotive side object detection system ("SODS"). The system includes a blockage detection processor, which is operative to determine whether an RF leakage signal level sensed between transmit and receive antennas of the system substantially match one or more of a plurality of pattern recognition information curves. If it is determined that the leakage signal level substantially matches one or more of a plurality of pattern recognition information curves, a blocked condition of the SODS is declared, as may be caused by mud, salt, ice, etc. The blockage detection processor is further operative to determine whether the leakage signal exceeds a predetermined blockage threshold level. If the leakage exceeds the predetermined blockage threshold level, a blocked condition of the SODS is also declared.

12 Claims, 6 Drawing Sheets

U.S. PATENT DOCUMENTS

| | | |
|---|---|---|
| 5,014,200 A | 5/1991 | Chundrlik et al. |
| 5,023,617 A | 6/1991 | Deering |
| 5,045,856 A | 9/1991 | Paoletti |
| 5,115,245 A | 5/1992 | Wen et al. |
| 5,134,411 A | 7/1992 | Adler |
| 5,138,321 A | 8/1992 | Hammer |
| 5,173,859 A | 12/1992 | Deering |
| 5,189,426 A | 2/1993 | Asbury et al. |
| 5,235,316 A | 8/1993 | Qualizza |
| 5,243,358 A | 9/1993 | Sanford et al. |
| 5,249,027 A | 9/1993 | Mathur et al. |
| 5,249,157 A | 9/1993 | Taylor |
| 5,252,981 A | 10/1993 | Grein et al. |
| 5,268,692 A | 12/1993 | Grosch et al. |
| 5,280,288 A | 1/1994 | Sherry et al. |
| 5,285,207 A | 2/1994 | Asbury et al. |
| 5,302,956 A | 4/1994 | Asbury et al. |
| 5,315,303 A | 5/1994 | Tsou et al. |
| 5,325,097 A | 6/1994 | Zhang et al. |
| 5,332,057 A | 7/1994 | Butsuen et al. |
| 5,339,075 A | 8/1994 | Abst et al. |
| 5,341,144 A | 8/1994 | Stove |
| 5,351,044 A | 9/1994 | Mathur et al. |
| 5,369,591 A | 11/1994 | Broxmeyer |
| 5,390,118 A | 2/1995 | Margolis et al. |
| 5,400,864 A | 3/1995 | Winner et al. |
| 5,414,643 A | 5/1995 | Blackman et al. |
| 5,428,359 A | 6/1995 | Yoneyama et al. |
| 5,454,442 A | 10/1995 | Labuhn et al. |
| 5,467,072 A | 11/1995 | Michael |
| 5,467,283 A | 11/1995 | Butsuen et al. |
| 5,471,214 A | 11/1995 | Faibish et al. |
| 5,481,268 A | 1/1996 | Higgins |
| 5,483,453 A | 1/1996 | Uemura et al. |
| 5,485,155 A | 1/1996 | Hibino |
| 5,485,159 A * | 1/1996 | Zhang et al. ............... 342/165 |
| 5,486,832 A | 1/1996 | Hulderman |
| 5,493,302 A | 2/1996 | Woll et al. |
| 5,495,252 A | 2/1996 | Adler |
| 5,508,706 A | 4/1996 | Tsou et al. |
| 5,512,901 A | 4/1996 | Chen et al. |
| 5,521,579 A | 5/1996 | Bernhard |
| 5,525,995 A | 6/1996 | Benner |
| 5,572,428 A | 11/1996 | Ishida et al. |
| 5,583,495 A | 12/1996 | Ben Lu Lu |
| 5,587,908 A | 12/1996 | Kajiwara |
| 5,627,510 A | 5/1997 | Yuan |
| 5,627,511 A | 5/1997 | Takagi et al. |
| 5,654,715 A | 8/1997 | Hayashikura et al. |
| 5,670,963 A | 9/1997 | Kubota et al. |
| 5,678,650 A | 10/1997 | Ishihara et al. |
| 5,712,640 A | 1/1998 | Andou et al. |
| 5,715,044 A | 2/1998 | Hayes |
| 5,717,399 A | 2/1998 | Urabe et al. |
| 5,719,580 A | 2/1998 | Core |
| 5,731,778 A | 3/1998 | Nakatani et al. |
| 5,734,344 A | 3/1998 | Yamada |
| 5,757,074 A | 5/1998 | Matloubian et al. |
| 5,767,793 A | 6/1998 | Agravante et al. |
| 5,771,007 A | 6/1998 | Arai et al. |
| 5,777,563 A | 7/1998 | Minissale et al. |
| 5,805,103 A | 9/1998 | Doi et al. |
| 5,806,019 A | 9/1998 | Ishiyama ............... 701/300 |
| 5,808,561 A | 9/1998 | Kinoshita et al. |
| 5,808,728 A | 9/1998 | Uehara |
| 5,818,355 A | 10/1998 | Shirai et al. |
| 5,818,383 A | 10/1998 | Stockburger et al. |
| 5,839,534 A | 11/1998 | Chakraborty et al. |
| 5,886,671 A | 3/1999 | Riemer et al. |
| 5,905,472 A | 5/1999 | Wolfson et al. |
| 5,923,280 A | 7/1999 | Farmer |
| 5,929,802 A | 7/1999 | Russell et al. ............... 342/70 |
| 5,938,714 A | 8/1999 | Santonaka |
| 5,940,011 A | 8/1999 | Agravante et al. |
| 5,949,366 A | 9/1999 | Herrmann |
| 5,959,570 A * | 9/1999 | Russell ............... 342/70 |
| 5,977,904 A | 11/1999 | Mizuno et al. |
| 5,978,736 A | 11/1999 | Greendale |
| 5,999,092 A | 12/1999 | Smith et al. |
| 6,018,308 A | 1/2000 | Shirai |
| 6,026,353 A | 2/2000 | Winner |
| 6,028,548 A | 2/2000 | Farmer |
| 6,037,894 A | 3/2000 | Pfizenmaier et al. |
| 6,040,796 A | 3/2000 | Matsugatani et al. |
| 6,043,772 A | 3/2000 | Voigtlaender et al. |
| 6,049,257 A | 4/2000 | Hauk |
| 6,052,080 A | 4/2000 | Magori |
| 6,057,797 A | 5/2000 | Wagner |
| 6,069,581 A | 5/2000 | Bell et al. |
| 6,070,682 A | 6/2000 | Isogai et al. |
| 6,075,492 A | 6/2000 | Schmidt et al. |
| 6,076,622 A | 6/2000 | Chakraborty et al. |
| 6,085,151 A | 7/2000 | Farmer et al. |
| 6,087,975 A | 7/2000 | Sugimoto et al. |
| 6,097,331 A | 8/2000 | Matsugatani et al. |
| 6,107,956 A | 8/2000 | Russell et al. ............... 342/70 |
| 6,124,823 A | 9/2000 | Tokoro ............... 342/70 |
| 6,127,965 A | 10/2000 | McDade et al. |
| 6,147,637 A | 11/2000 | Morikawa et al. |
| 6,147,638 A | 11/2000 | Rohling et al. |
| 6,154,168 A | 11/2000 | Egawa et al. |
| 6,154,176 A | 11/2000 | Fathy et al. |
| 6,161,073 A | 12/2000 | Tange et al. |
| 6,163,252 A | 12/2000 | Nishiwaki |
| 6,184,819 B1 | 2/2001 | Adomat et al. |
| 6,188,950 B1 | 2/2001 | Tsutsumi et al. |
| 6,198,426 B1 | 3/2001 | Tamatsu et al. |
| 6,215,438 B1 | 4/2001 | Oswald et al. |
| 6,225,918 B1 | 5/2001 | Kam |
| 6,232,910 B1 | 5/2001 | Bell et al. |
| 6,233,516 B1 | 5/2001 | Egawa |
| 6,255,984 B1 | 7/2001 | Kreppold et al. |
| 6,256,573 B1 | 7/2001 | Higashimata |
| 6,259,395 B1 | 7/2001 | Adachi et al. |
| 6,265,990 B1 | 7/2001 | Isogai et al. |
| 6,268,803 B1 | 7/2001 | Gunderson et al. |
| 6,269,298 B1 | 7/2001 | Seto |
| 6,278,400 B1 | 8/2001 | Cassen et al. |
| 6,307,622 B1 | 10/2001 | Lewis |
| 6,317,073 B1 | 11/2001 | Tamatsu et al. |
| 6,317,075 B1 | 11/2001 | Heide et al. |
| 6,317,090 B1 | 11/2001 | Nagy et al. |
| 6,320,547 B1 | 11/2001 | Fathy et al. |
| 6,327,530 B1 | 12/2001 | Nishimura et al. |
| 6,329,952 B1 | 12/2001 | Grace |
| 6,330,507 B1 | 12/2001 | Adachi et al. |
| 6,335,705 B1 | 1/2002 | Grace et al. |
| 6,345,227 B1 | 2/2002 | Egawa et al. |
| 6,351,702 B1 | 2/2002 | Tange et al. |
| 6,366,235 B1 | 4/2002 | Mayer et al. |
| 6,469,659 B1 | 10/2002 | Lajiness et al. ............. 342/173 |
| 2002/0044082 A1 | 4/2002 | Woodington et al. |
| 2002/0049539 A1 | 4/2002 | Russell et al. |
| 2002/0067287 A1 | 6/2002 | Delcheccolo et al. |

* cited by examiner

Detection Report Matrix — 13e

| | Minor Cycle 1 (Beam a) | Minor Cycle 2 (Beam b) | Minor Cycle 3 (Beam c) | Minor Cycle 4 (Beam d) | Minor Cycle 5 (Beam e) | Minor Cycle 6 (Beam f) | Minor Cycle 7 (Beam g) |
|---|---|---|---|---|---|---|---|
| Major Cycle 1 | T, R | T, R | T, R | T, R | T, R | F | F |
| Major Cycle 2 | T, R | T, R | T, R | T, R | T, R | F | F |
| Major Cycle 3 | T, R | T, R | T, R | T, R | T, R | F | F |

$x_2 = x_1 + v_R \tau$  Where, $\tau$ = time

AUTOMOTIVE SIDE OBJECT DETECTION SENSOR BLOCKAGE DETECTION SYSTEM AND RELATED TECHNIQUES

CROSS-REFERENCE TO RELATED APPLICATIONS

Not Applicable.

STATEMENTS REGARDING FEDERALLY SPONSORED RESEARCH

Not applicable.

BACKGROUND OF THE INVENTION

As is know in the art, there has been a trend to include detectors in vehicles, such as automobiles. It is necessary to provide a detector that is capable of accurately and reliability detecting objects in the path of the vehicle. Such a detector is sometimes referred to as a Side Object Detection Sensor ("SODS") and must be relatively insensitive to the relative location of the automobile and obstacles and environmental conditions, such as temperature, humidity, ice and rain.

Radar is a suitable technology for implementing an automotive SODS. One type of radar suitable for this purpose is Frequency Modulated Continuous Wave (FMCW) radar. In typical FMCW radar, the frequency of the transmitted CW signal linearly increases from a first predetermined frequency to a second predetermined frequency. FMCW radar has the advantages of high sensitivity, relatively low transmitter power and good range resolution.

Because the SODS is a consumer product which may affect the safety of vehicles, the accuracy and reliability of the sensor are tantamount. Aspects of the SODS which contribute to its accuracy and reliability include its susceptibility to noise and the overall precision with which received radio frequency (RF) signals are processed to detect objects within the field of view of the SODS. Susceptibility to noise for example can cause false detections and, even more deleteriously, cause an object to go undetected.

Further significant attributes of the SODS are related to its physical size and form factor. Preferably, the FLS is housed in a relatively small enclosure mountable behind the forward surface of the vehicle's engine housing, or grill. For accuracy and reliability, it is imperative that the transmit and receive antenna and circuitry are unaffected by attributes of the vehicle grill and are mounted to the vehicle in a predictable alignment.

Also impacting the accuracy and reliability of the SODS is the existence of foreign matter or objects which undesirably block one or more portions of the SODS transmit and/or receive antennas and in particular block portions of the RF energy propagating to and from the SODS transmit and receive antennas. Such blockage, can be caused by an accumulation, over a period of time, of foreign matter or objects in the region of the antenna aperture. Such foreign matter may be caused for example by environmental conditions such as temperature, humidity, ice, rain and the like. Such blockage can degrade, or in extreme cases even prevent, proper operation of the SODS. Once a vehicle in which an FLS is mounted is deployed on the road, a gradual, continual accumulation of foreign matter can occur. This results in a corresponding gradual decrease in SODS system performance thus making it relatively difficult to detect the existence of antenna blockage sue to gradual accumulation of foreign matter.

It would, therefore, be desirable to provide an SODS which is capable of detecting antenna blockage. It would also be desirable to provide an SODS which is capable of detecting antenna blockage due to the accumulation of foreign matter, such as mud, ice, snow or the like, on the vehicle on that area of the vehicle in which the SODS is mounted. It would further be desirable to provide an SODS which detects antenna blockage and which alerts a system user of the existence of such blockage.

BRIEF SUMMARY OF THE INVENTION

In accordance with embodiments of the present invention, set forth is a system for detecting antenna blockage of a radar system, such as a SODS mounted on an automobile. The system for detecting antenna blockage of the radar system includes a blockage detection processor adapted to receive a plurality of signals provided by a signal processor included on the radar system or by external sources to detect a blocked condition of the antenna of the radar system. In an embodiment, the blockage detection processor includes a vehicle speed input, sensor temperature input and pattern recognition information input.

In one aspect of the present invention, a method of operating the system for detecting antenna blockage in a radar system, which includes a transmit antenna and a receive antenna, includes sensing a first leakage signal communicated between the transmit and receive antennas and comparing the energy level of the first leakage signal to at least one of a number of predetermined pattern recognition profiles. The method further includes determining if the first leakage signal substantially matches predetermined characteristics of any one of the number of predetermined pattern recognition profiles. If it is determined that the first leakage signal substantially matching the predetermined characteristics of any one of the number of predetermined pattern recognition profiles, the system generates a first signal having a first value corresponding to an antenna blockage. If it is determined that the first leakage signal does not match the predetermined characteristics of any one of the number of predetermined pattern recognition profiles, the system generates a second signal having a second value corresponding to an absence of antenna blockage.

The method further includes determining if the energy level of the first leakage signal deviates from a predetermined leakage signal threshold level. If the first leakage signal deviates from the predetermined leakage signal threshold level, the system generates the first signal. Furthermore, if the first leakage signal does not deviate from the leakage signal threshold level, the system generates the second signal.

In another aspect of the present invention, the method further includes determining if the energy level of the first leakage signal deviates from a predetermined leakage signal threshold level. If it is determined that the first leakage signal deviates from the predetermined leakage signal threshold level, the system generating the first signal. Further, if the first leakage signal does not deviates from the leakage signal threshold level, the system generates the second signal. The above described method can be cyclically repeated a predetermined number of times to generate a plurality of the first signals and a plurality of the second signals. After generating the plurality of the first signals and the plurality of the second signals, the method further includes determining if a predetermined number of the first signals are present. If it is determined that the predetermined number of the first signals are present, the system generates an antenna blockage detection signal.

The method of comparing the energy level of the first leakage signal to at least one of a number of predetermined pattern recognition profiles, as described above, further includes comparing the energy level of the first leakage signal to at least one of a number of predetermined pattern recognition profiles previously stored in a database. The predetermined pattern recognition profiles, which are stored in the database, represent signatures associated with a plurality of different objects likely to block the antenna causing the antenna blockage.

The method of comparing the energy level of the first leakage signal to at least one of a number of predetermined pattern recognition profiles, as described above, further includes comparing the energy level of the first leakage signal to at least one reference leakage signal profile previously stored in the database. The reference leakage signal profile represents a leakage signature generated in the absence of antenna blockage.

The method of generating the antenna blockage signal, as described above, further includes generating a plurality of first values associated with each of the plurality of first signals, which represent a presence of an antenna blockage. Furthermore, the method includes generating a plurality of distance values, which are associated with each of the plurality of first signals. The distance values represent a distance between the antenna and an object associated with the blockage.

The method of determining if a predetermined number of the first signals are present includes sensing a velocity signal associated with relative motion of the antenna. If the plurality of distance values, as described above, are substantially equivalent during the sensing of the velocity signal, the system generates the antenna blockage detection flag.

BRIEF DESCRIPTION OF THE DRAWINGS

The foregoing features of this invention, as well as the invention itself, may be more fully understood from the following description of the drawings in which.

DETAILED DESCRIPTION OF THE INVENTION

Figure 1:
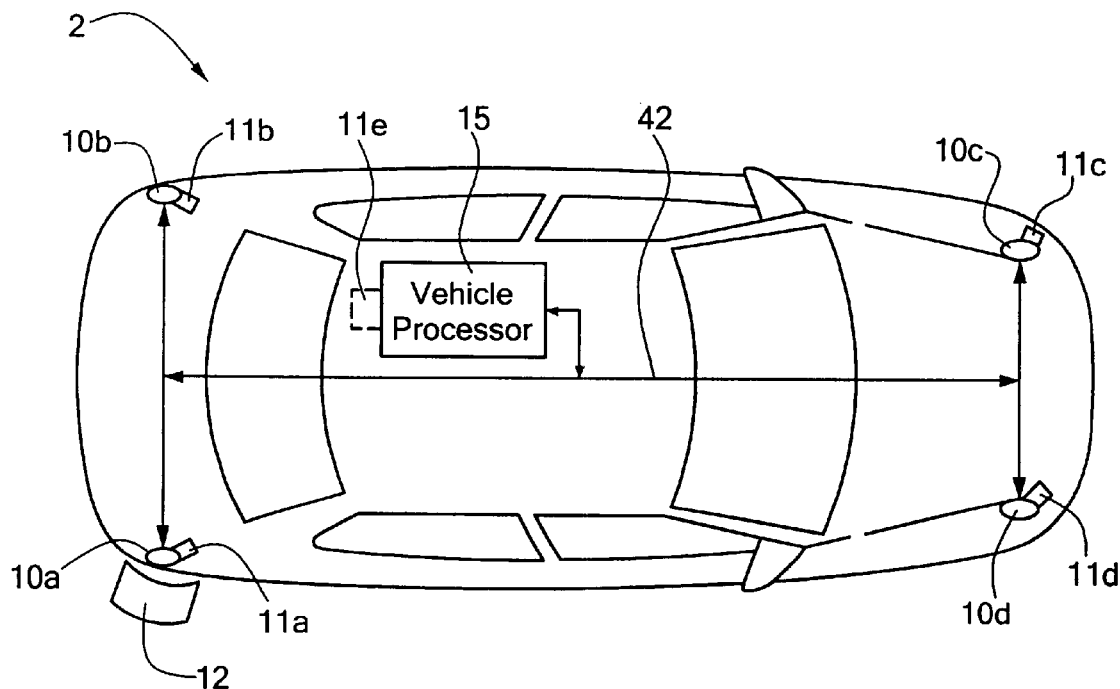
FIG. 1 is a high level plan view of an automobile incorporating a plurality of SODSs, which each incorporate a blockage detection system having principle of the present invention.

Referring to FIG. 1, shown is an automobile 2 incorporating features of the present invention. Specifically, the automobile 2 includes one or more SODS 10a, 10b, 10c and 10d mounted at various locations on the automobile 2, which SODS 10a, 10b, 10c and 10d each include a corresponding system for detecting blockage 11a, 11b, 11c and 11d thereof. The system for detecting blockage 11a, 11b, 11c and 11d, which is associated with each of the one or more SODS 10a, 10b, 10c and 10d can be adapted to alert a user of the automobile 2 as to a blocked condition of the SODS 10a, 10b, 10c and 10d. In response to the alert, the user can take remedial actions to clear the blocked condition. The exemplary blockage object 12 of the SODS 10a, for example, can include a number of different objects or matter (or a combination of objects and matter), such as snow, salt, ice, dirt or the like that adhere to or effectively block the SODS 10a. The automobile 2 can further include a vehicle processing unit 15, which is coupled to each of the SODS 10a, 10b, 10c and 10d and to each associated system for detecting blockage 11a, 11b, 11c and 11d. It should be realized that each of the SODS 10a, 10b, 10c and 10d; and each system for detecting blockage 11a, 11b, 11c and 11d associated therewith are similarly constructed. Thus, in order to simplify the description, only the SODS 10a and the associated system for detecting blockage 11a will be described herein and will be respectively referred to hereinafter as "SODS 10" and "system for detecting blockage 11".

Although the system for detecting blockage is shown and described herein as being incorporated within the SODS 10, it should be realized that a single discrete system for detecting blockage 11e can be couple to the vehicle processor for remotely communicating with each of the SODS 10a, 10b, 10c and 10d without departing from the spirit and scope of the invention. In this arrangement, a single discrete system for detecting blockage 11e can simultaneously monitor each of the SODS 10a, 10b, 10c and 10d while minimizing any circuitry and/or component duplication.

Figure 2:
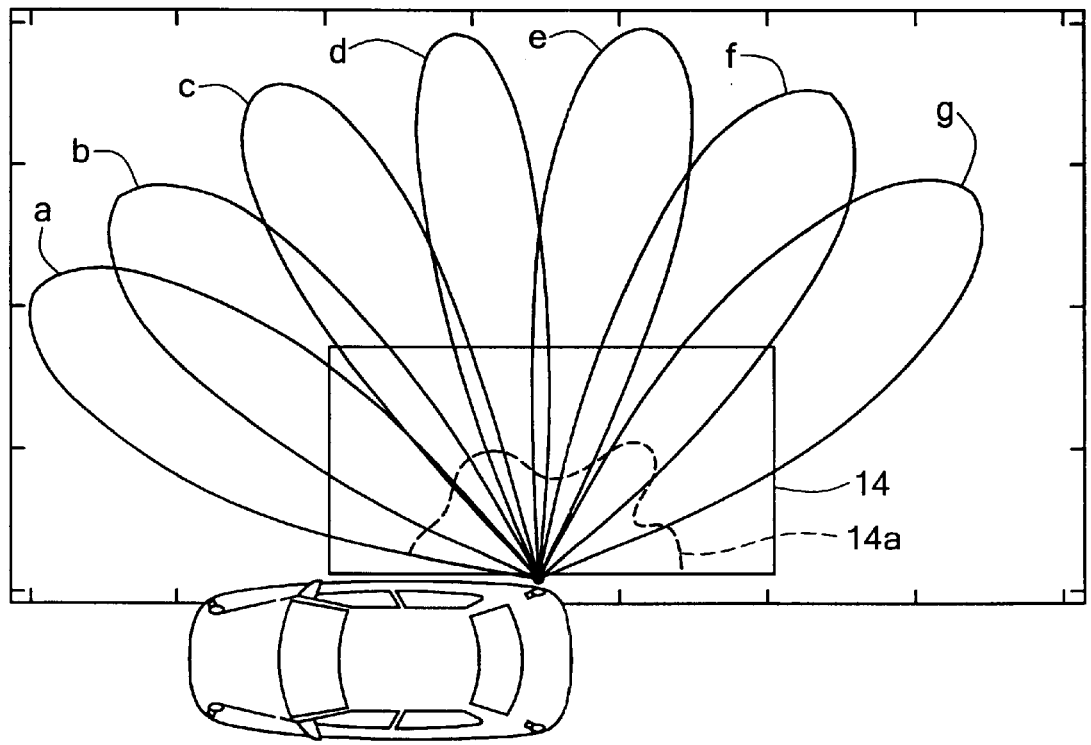
FIG. 2 is a high level plan view of a field of view of one of the plurality of SODSs of FIG. 1.

Referring to FIG. 2, shown is one exemplary field of view or detection zone 14 realized by the SODS 10 of FIG. 1, described above. The exemplary field of view 14 is provided from a plurality of antenna beams, for example, seven antenna beams a–g. Each of the beams a–g includes a beamwidth of approximately fifteen to twenty degrees resulting in a total azimuth scan in excess of one hundred fifty degrees. It will be recognized by one of ordinary skill in the art that other numbers of beams a–g (e.g. fewer or more than seven) and numerous scan angles are possible without departing from the spirit and scope of the present invention. The particular number of antenna beams a–g to use in a particular application is selected in accordance with a variety of factors including but not limited to the desired resolution of the field of view 14. The field of view 14 or detection zone is here provided having a substantially rectangular shape, which defines a maximum boundary of interest. In other embodiments, however, the field of view shape can correspond to a number of other shapes, such as a trapezoid or an arc. Furthermore, the size and shape of the detection zone 14 can be dynamically programmed as described in co-pending application Ser. No. 09/930,867 entitled TECHNIQUE FOR CHANGING A RANGE GATE AND RADAR COVERAGE assigned to the assignee of the present invention and incorporated herein by reference in its entirety.

The SODS 10, which is incorporated in the automobile 2, utilizes Frequency Modulated Continuous Wave (FMCW) radar technology and is adapted for mounting on the automobile 2 to detect one or more objects, or targets in the field of view 14 of the SODS 10. In this application, the targets (not shown) can include other cars, trees, signs, pedestrians, etc. The SODS 10 detects one or more targets in its field of view 14 and classifies each target as either a "primary" target or a "secondary" target. The primary, or lead target may be defined in various ways and, in the illustrative embodiment, is the closest object to the SODS 10. The field of view 14, however, can be distorted by the blockage object 12, which results in an effective field of view as graphically represented by the dotted line 14a of FIG. 2. Moreover, the distorted field of view 14a can be further distorted by the blockage object 12 to the point where the field of view 14a is virtually non-existent or approximately equal to zero.

Figure 3:
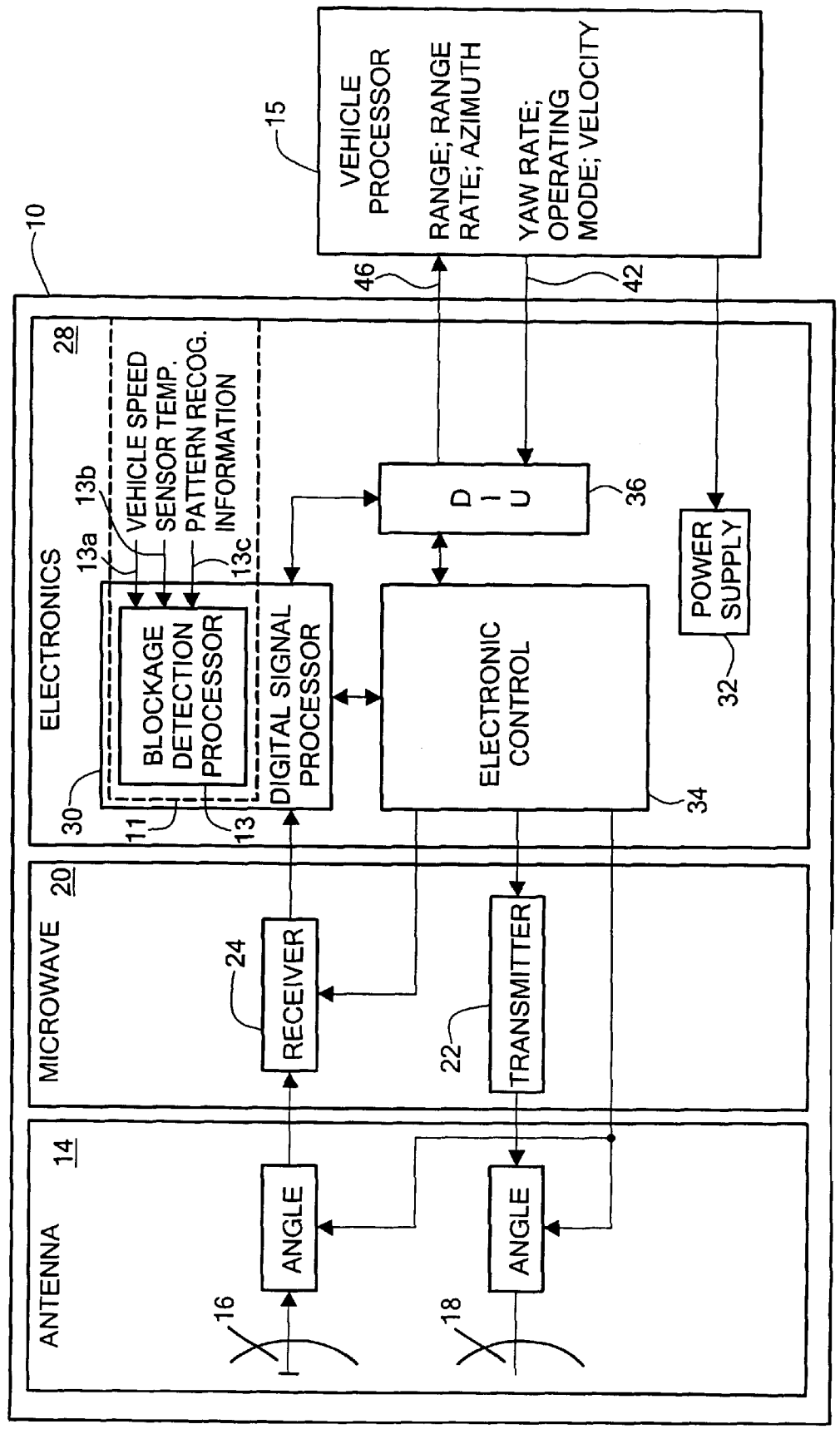
FIG. 3 is a high level block diagram of one of the plurality of SODSs of FIG. 1.

Referring to FIG. 3, a SODS 10 includes an antenna assembly 14, a microwave assembly 20 having both a transmitter 22 and a receiver 24, and an electronic assembly 28, consisting of a signal processor 30, power supplies 32, control circuits 34 and a digital interface 36. The signal processor 30 also includes the system for detecting blockage 11 of the SODS 10. The system for detecting blockage 11 includes a blockage detection processor 13 adapted to receive a plurality of signals provided by the signal processor 30 or by external sources to detect a blocked condition of the SODS. In an embodiment, the blockage detection processor 13 includes a vehicle speed input 13a, sensor temperature input 13b and pattern recognition information input 13c, all of which will be discussed in detail below.

Control signals are provided by the vehicle processor 15 to the SODS 10 via a signal bus 42 (FIG. 1). These control signals include a yaw rate signal corresponding to a yaw rate associated with the automobile 2 and a velocity signal corresponding to the velocity of the automobile 2. In response to these control signals and reflected RF signals received by the SODS 10, the SODS 10 provides one or more output signals characterizing the primary target within its field of view 14, via the signal bus 42, to the automobile 2. These output signals include a range signal indicative of a range associated with a primary target in the field of view of the sensor 10, a range rate signal indicative of a range rate associated with the primary target and an azimuth signal indicative of the azimuth associated with the primary target relative to the automobile 2.

The antenna assembly 14 includes two antennas, a receive antenna 16 for receiving RF signals and a transmit antenna 18 for transmitting RF signals. The SODS 10 may be characterized as a bi-static radar sensor since it includes separate transmit and receive antennas. The antennas 16, 18 are multi-lobed and are controlled in parallel as to point in the same direction. Various circuitry for selecting the angle of the respective antennas 16, 18 is suitable, including a multi-position switch.

The output from the receive antenna 16 is coupled to the microwave receiver 24, where one or more local oscillator signals are offset in frequency from the transmitted signal frequency by a fixed amount. The output signal of the receiver 24 is at an offset frequency, with the target frequencies either above or below it.

The receiver 24 includes an analog-to-digital (A/D) converter, which samples an amplified version of the received RF signal at a rate at least twice the largest frequency out of the receiver. These signal samples are processed by a Fast Fourier Transform (FFT) within the digital signal processor 30 in order to determine the content of the signal within various frequency ranges (i.e., frequency bins). The FFT outputs serve as data for the rest of the signal processor 30, including the blockage detection processor 13. The remaining parts of the SODS 10 are standard items, including power supply 32, control circuits 34, including a system clock (crystal controlled oscillator) for frequency stability, and digital interface 36.

The manner by which the signal processor 30 processes received RF signals to provide the above-described output signals via the output signal bus 46 to the vehicle 40 indicative of range, range rate and/or azimuth of a primary target is described below in conjunction in commonly owned U.S. Pat. No. 6,011,507, entitled RADAR SYSTEM AND METHOD OF OPERATING SAME, filed on Nov. 12, 1996, and U.S. Pat. No. 5,959,570, entitled AUTOMOTIVE FORWARD LOOKING SENSOR BLOCKAGE DETECTION SYSTEM AND RELATED TECHNIQUES, filed on Nov. 21, 1997, both of which are hereby incorporated by reference in their entirety.

The blockage detection processor 13 will be described in detail below in conjunction with FIG. 4 through FIG. 9. Suffice it here to say, the blockage detection processor 13 senses a leakage signal and compares the leakage signal to at least one of a number of predetermined pattern recognition profiles. In response to the leakage signal matching one or more of the profiles, the system generates a signal indicating the existence of a blockage of the SODS 10.

Figure 4:
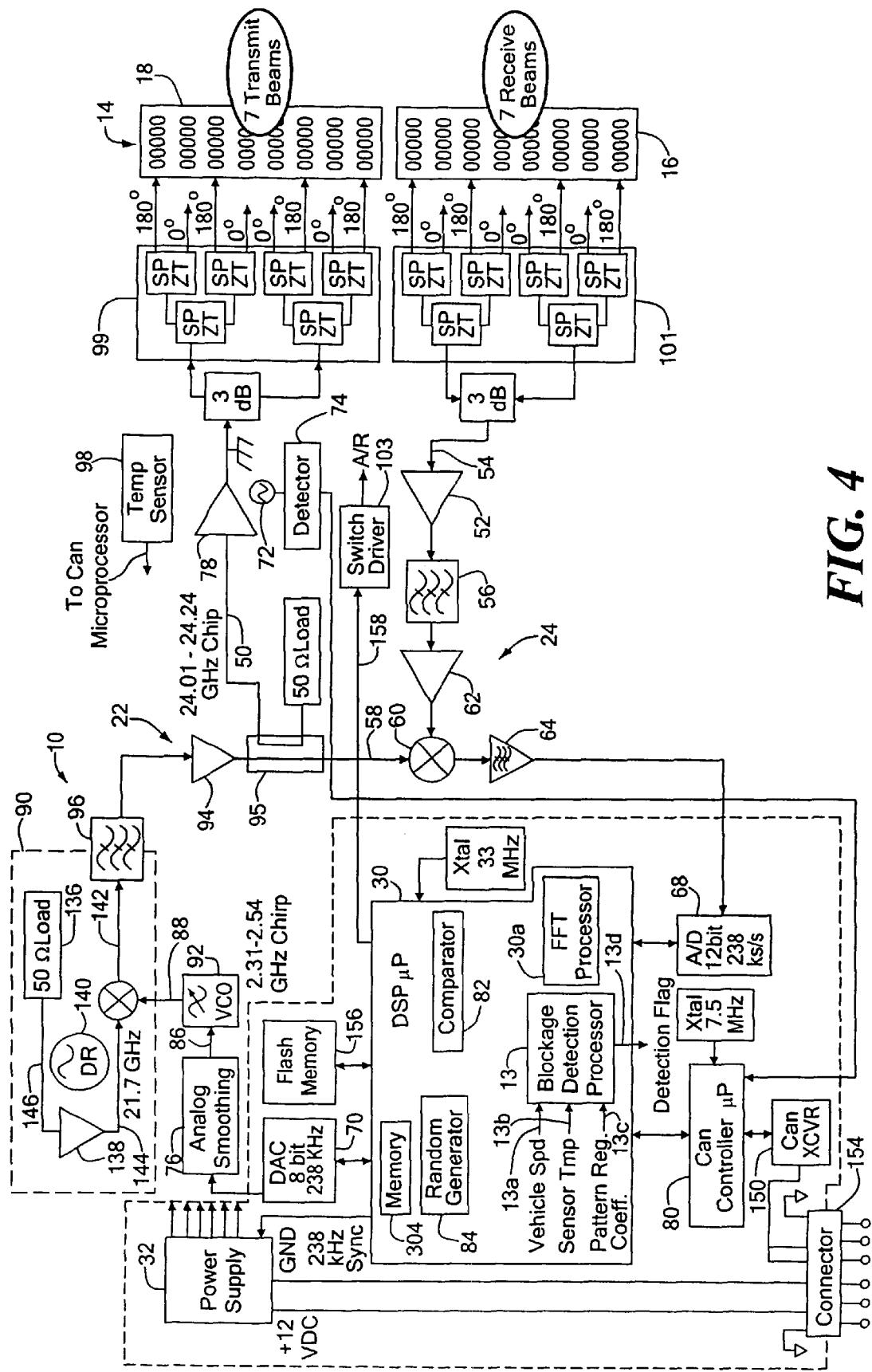
FIG. 4 is a detailed block diagram of one of the plurality of SODSs of FIG. 1.

Referring further to FIG. 4, in which like elements of FIG. 3 are provided having like reference designations, in general overview of the operation of the transmitter 22, the FMCW radar transmits a signal 50 having a frequency which changes in a predetermined manner over time. The transmit signal 50 is generally provided by feeding a VCO control or ramp signal 86 to a voltage controlled oscillator (VCO) 92. In response to the ramp signal 86, the VCO 92 generates a chirp signal 88.

A measure of transmit time of the RF signal can be determined by comparing the frequency of a received signal 54 with the frequency of a sample 58 of the transmit signal. The range determination is thus provided by measuring the beat frequency between the frequencies of the sample 58 of the transmit signal and the return signal 54, with the beat frequency being equal to the slope of the ramp signal 86 multiplied by the time delay of the return signal. The measured frequency further contains the Doppler frequency due to the relative velocity between the target and the radar system. In order to permit the two contributions to the measured frequency shift to be separated and identified, the time-varying frequency of the transmit signal 50 is achieved by providing a control signal 86 to the VCO 92 in the form of a linear ramp signal followed by either a CW signal or a ramp with the opposite slope.

According to one embodiment, the VCO control signal 86 is generated with digital circuitry and techniques. In another embodiment, the ramp signal 86 is generated by the DSP 30 and a digital-to-analog converter (DAC) 70. Use of the DSP 30 and DAC 70 to generate the ramp signal 86 is possible in the SOD system 10 since, it has been determined in accordance with the present invention, that by proper selection of the detection zone characteristics including but not limited to detection zone size, shape and resolution, precise linearity of the chirp signal 88 is not necessary. This is a result of the correlation that exists between the nonlinearities in the transmit and receive waveforms at close ranges. With this arrangement, the frequency of the transmit signal 50 is accurately and easily controllable which facilitates implementation of several advantageous and further inventive features.

As one example, one or more characteristics of successive ramps in the ramp signal 86 are randomly varied in order to reduce interference between similar, proximate radar systems. As another example, temperature compensation is implemented by appropriately adjusting the ramp signal 86. Further, changes to the SODS 10, which would otherwise require hardware changes or adjustments, can be made by simply downloading software to the DSP 30. For example, the frequency band of operation of the SOD system 10 can be readily varied, as may be desirable when the SOD is used in different countries with different operating frequency requirements.

The electronics portion 28 of the SODS 10 includes the DSP 30, the power supply 32, and a connector 154 through which signal bus 42 is coupled between the SODS 10 and the vehicle processor (FIG. 1). The digital interface 36 is provided in the form of a controller area network (CAN) transceiver (XCVR) 150, which is coupled to the DSP 30, via a CAN microcontroller 80. The CAN controller 80 has a system clock coupled thereto to provide frequency stability. In one embodiment, the system clock is provided as a crystal controlled oscillator. An analog-to-digital (A/D) converter 68 receives the output of a video amplifier 64 and converts the signal to digital form for coupling to the DSP 30 for detection processing. In one embodiment, the A/D converter 68 is provided as a twelve bit A/D converter. Those of ordinary skill in the art will appreciate, however, that any A/D converter having sufficient resolution for the particular application may be used. A digital signal bus 158 is coupled to antenna switch driver circuits 103, which in turn control microwave switches 99, 101 in order to provide control signals to drive the microwave switches, which in turn control antenna steering. Also provided in the electronics portion 28 of the SODS 10 is a flash memory 156 in which software instructions, or code and data are stored.

The DSP 30 includes the blockage detection processor 13, which is coupled to receive a plurality of digital signal samples generated by a Fast Fourier Transform of the digital samples provided by the A/D converter 68. The plurality of digital signal samples received by the blockage detection processor 13 represent various frequency ranges (i.e., frequency bins) sensed by the receiver 24. It is important to note that the blockage detection processor 13 is responsive to frequency ranges that appear in a zero Doppler frequency bin (e.g. the leakage signal). The zero Doppler bin is defined between the physical surface of the SODS 10 and a predetermined distance from the SODS 10. It has been determined that the presence of an object or matter 12 (FIG. 1), which blocks the transmitted signal from the SODS 10 results in the leakage signal having an unusually high signal level or unusually low signal level (the blockage signal could add up constructively or destructively with the leakage signal) when received by the receive antenna 16. This leakage signal, as stated above, will appear in the zero Doppler frequency bin. For example the predetermined distance that defines a distal boundary of the zero Doppler frequency bin can be approximately equal to 100 centimeters (cm).

The blockage detection processor 13 is further adapted to receive vehicle speed information over input line 13a, SODS 10 sensor temperature information over input line 13b and pattern recognition information over input line 13c. The vehicle speed information can be obtained from the vehicle processor (FIG. 1) and can include information related to the relative velocity of the automobile 2 carrying the SODS 10. The vehicle speed information can be processed in connection with other information received by the blockage detection processor to determine if a blockage object or matter 12 is moving or stationary relative to the SODS 10.

The SODS 10 temperature information can be obtained from the temperature sensor 98 located on the SODS 10 and can include temperature as well as humidity related information in close proximity to or on the SODS 10. The SODS 10 temperature information can be used by the blockage detection processor 13 to adjust system parameters, such as the signal strength levels of curves A–F (FIG. 5), to compensate for thermal effects on the SODS 10 calibration.

The pattern recognition information (e.g. in the form of coefficients) can be obtained from a first look-up table previously generated and stored in a memory associated with the DSP 30, such as a volatile memory device 304. The blockage detection processor can process attributes of the pattern recognition information in connection with the sensed leakage signal to determine if a blockage condition of the SODS 10 is present, which will be described in detail below. If the blockage detection processor 13 determines that a blockage condition is present, a blockage detection flag is generated and communicated to a detection report matrix (FIG. 7) over output line 13d.

Figure 5:
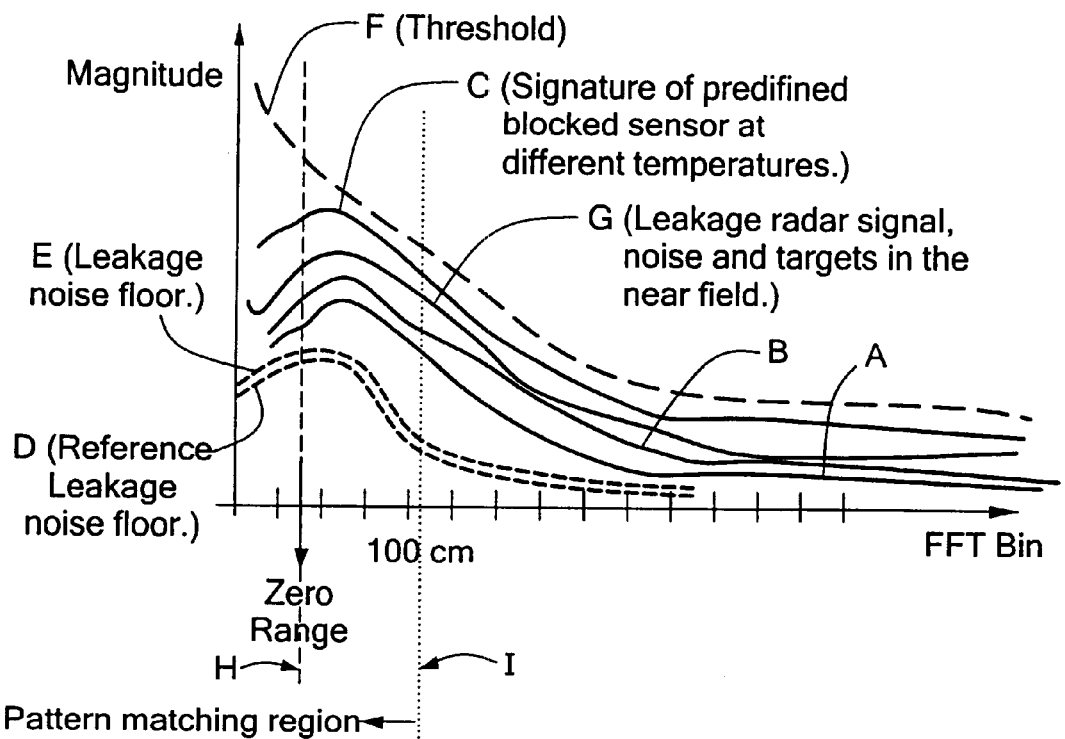
FIG. 5 is a graphical representation of a plurality of curves representing actual and reference leakage signal levels, a plurality of predetermined blockage curves and a blockage detection threshold curve, one or more of which can be employed by the SODS of FIG. 4 to determine if a blockage condition of the SODS is present.

Referring further to FIG. 5, the pattern recognition information is employed by the blockage detection processor 13 to detect if a blocked condition of the SODS 10 is present. The pattern recognition information can include information that define a plurality of curves representing different sensed leakage signals that are associated with different objects and/or matter 12, which cause a blocked condition of the SODS 10. For example, a first set of pattern recognition information define a first curve "A" corresponding to a leakage signal response which results when snow blocks a transmit and/or receive surface of the SODS 10. In another example, a second set of pattern recognition information define a second curve "B" corresponding to a leakage signal response which results when dirt blocks the transmit and/or receive surface of the SODS 10. In yet another example, a third set of pattern recognition information define a third curve "C" corresponding to a sensed leakage signal response which results when a combination of snow and dirt blocks the transmit and/or receive surface of the SODS 10. Other sets of pattern recognition information can define a plurality of different curves corresponding to leakage signal responses associated with a plurality of individual or combinations of objects and/or matter 12, including but not limited to ice, mud and salt.

The first look-up table can further include other parameters, which are employed by the blockage detection processor 13 to detect if a blocked condition of the SODS 10 is present. More precisely, the first look-up table can further include a reference set of pattern recognition information that defines a reference curve "D" representing a reference sensed leakage signal which is associated with the absence of any objects and/or matter blocking the SODS 10. In other words, the reference curve D is associated with an expected sensed leakage signal in the absence of a blocked condition of the SODS 10. The reference sensed leakage signal, for example, can be obtained from determining the signal level of the average sensed leakage signal over a predetermined period of time. The curve "E" represents the actual sensed leakage signal presented to the receiver in real-time.

Additionally, the first look-up table can also include a set of pattern recognition information that define a curve "F"

representing the blockage threshold curve. If the blockage detection processor determines that a sensed leakage single exceeds or drops below the blockage threshold curve, a blockage condition of the SODS is declared. For example, a predetermined threshold level of the blockage threshold curve F may be on the order of 2-decibels (db) above or below an expected leakage signal level. Those of ordinary skill in the art will appreciate of course that other threshold levels may be used. The particular threshold level used my be selected in accordance with a variety of factors including but not limited to receiver sensitivity, transmitter power, transmit and receive antenna efficiency and the like.

The curve "G" represents an exemplary leakage signal resulting from a blocked condition of the SODS 10. It is important to note that the curve G does not cross a blockage threshold curve F, (described below) and thus would not result in a blockage detection of the SODS 10 being declared. Nevertheless, in accordance with the present invention, by substantially matching characteristics of the curve G with characteristics of at least one of the curves A–D, a blockage detection of the SODS 10 can be detected and declared.

Figure 6:
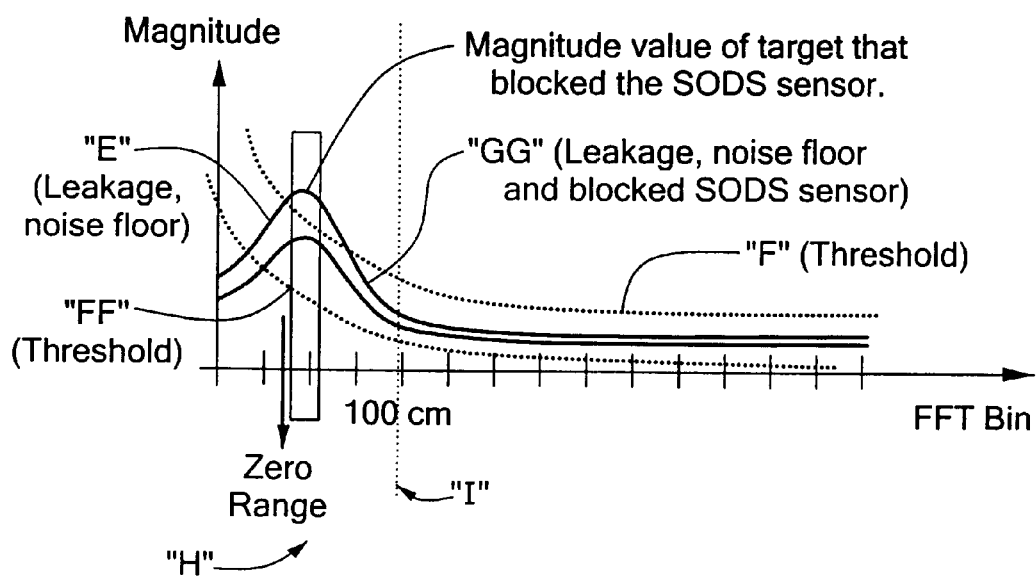
FIG. 6 is another similar graphical representation of a plurality of curves representing an expected and an actual leakage signal levels in the event of a blockage condition of the SODS of FIG. 4.

With further reference to FIG. 6, which shows leakage noise curve E and the blockage threshold curve F, which curves E and F are both similar to that shown in FIG. 5. However, in this graph, the curve G from FIG. 5 has increased in signal level, as represented by the curve GG, which crosses the threshold formed by the blockage threshold curve F. In this instance, a blockage condition of the SODS 10 is detected and declared, because the curve GG exceeds the blockage threshold curve "F" within the blockage range defined by the "H" and "I" vertical asymptotes.

Figures 7, 8:
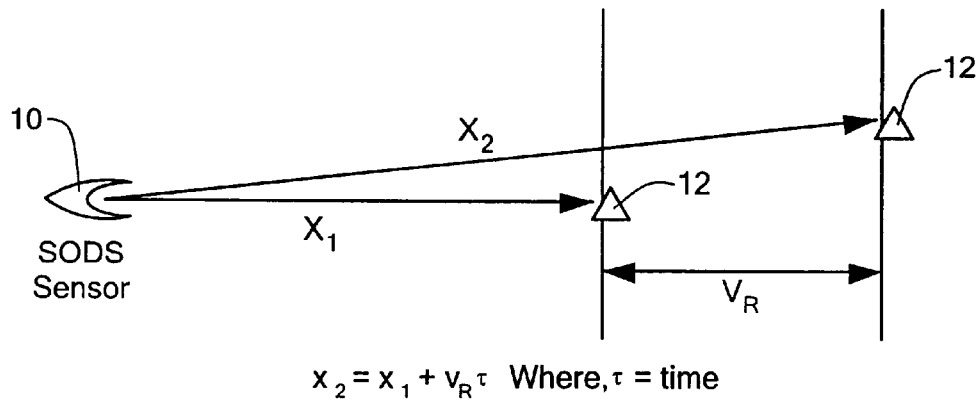
FIG. 7 is an exemplary detection report matrix for storing a plurality if values associated with targets and ranges, as detected by the SODS of FIG. 4.
FIG. 8 is an exemplary range value analysis executed by the SODS of FIG. 4.

Referring to FIG. 7, shown is an exemplary detection report matrix 13e, which includes a plurality of values arranged into a number of rows corresponding to major cycles and a number of columns corresponding minor cycles. Specifically, a major cycle is defined by a single complete sweep or cycle of a plurality of antenna beams, and for which dimensions of the plurality of antenna beams defines the field of view or detection zone 14. Further, a minor cycle is defined by each antenna beam included in the plurality of antenna beams of each major cycle. For example, as described in the exemplary embodiment, a major cycle can be defined by the single complete sweep or cycle of antenna beams a–g, as previously described above with respect to FIG. 2. Therefore, the detection report matrix 13e of this exemplary embodiment includes three rows corresponding to three major cycles and seven columns corresponding seven minor cycles (e.g. one minor cycle for each of the seven beam a–g).

Each entry of a value in the detection report matrix 13e is representative of the output of the blockage detection processor 13 (FIG. 4) received over output line 13d. A "T" (true) value indicates the assertion of a blockage detection flag by the blockage detection processor 13 over output line 13d, as previously described above. A "R" (range) value, which is associated with each "T" value, indicates a range to the object or matter 12, which results in the assertion of a blockage detection flag representing a blockage condition of the SODS 10. A "F" (false) value indicates that a blockage detection flag has not been asserted by the blockage detection processor 13 over output line 13d.

In an embodiment, each address location (row and column) of the detection report matrix 13e can be initialized or initially populated with an "F" value. In the event that a blocked condition of the SODS 10 is detected, as described above, the previously populated "F" value can be replaced or overwritten with "T" and "R" values.

In the exemplary detection report matrix 13e, major cycle-1 includes the detection of a blockage condition of the SODS 10 (detection flag asserted by the blockage detection processor 13) in minor cycles one through five, which are associated with beams a–e. This blockage condition is represented in each of the minor cycles one through five with the values T, R, as previously defined. Further in major cycle-1, minor cycles six and seven associated with beams f and g did not include the detection of a blockage condition of the SODS 10 (detection flag not asserted by the blockage detection processor 13). This absence of a blockage condition is represented in each of the minor cycles six and seven with the values F, as previously defined. Major cycle-2 and major cycle-3 have detected similar blockages (T), ranges (R), and the absence of blockages (F) as detected by the blockage detection processor 13, and as populated into the detection report matrix 13e.

After populating the values described above into the detection report matrix 13e, the blockage detection processor 13 can analyze predetermined patterns of repetition of the values T, R, to conclude whether a blocked condition of the SODS is present. Thereafter, if it is determined that a blocked condition of the SODS is in fact present, a user of the automobile 2 can be notified by an alert message, such as an alert light or audible alert or the information can be used to take some other action.

False alerts issued to users of the automobile 2 are significantly reduced by requiring a predetermined pattern of repetitions of the values of T, R to be present in the detection report matrix 13e prior to issuing the alert. In an embodiment, the predetermined patterns of repetition of the values T, R, which are populated into the detection report matrix by the blockage detection processor, includes detecting that the values T, R are populated into the detection report matrix 13e in at least five consecutive minor cycles of a major cycle and that this pattern is repeated in at least two consecutive major cycles. For example, if the values T, R are populated into the detection report matrix 13e in five consecutive minor cycles and this pattern is repeated over two consecutive major cycles, as noted by the boxed region 13e l of the detection report matrix 13e, then a blocked condition of the SODS 10 is detected and a subsequent alert can be issued to the user of the automobile 2.

Although the detection report matrix described above depicts three rows and seven columns, it should be understood that both the number of rows and columns can be expanded depending upon the amount of data that is desired or required for blockage condition analysis, as described above.

Referring further to FIG. 8, the plurality of range values R, which are associated with each detection (T) of a blockage condition of the SODS 10, include a numerical value corresponding to an actual range or distance between the transmitter and/or receiver surface and the object or matter 12 responsible for causing the blocked condition of the SODS 10. For example, the numerical value of R located in the detection report matrix at major cycle-1 and minor cycle-1 can be defined as "X1". Further, the numerical value of R located in the detection report matrix at major cycle-2 and minor cycle-2 can be defined as "X2". In this example, a blocked condition of the SODS is determined because the above described predetermined pattern of repetition of the values T, R are satisfied. However, prior to alerting a user of the automobile 2, the blockage detection processor 13 analyzes the numerical values of X1 and X2 in accordance with the equation X2=X1+(VR)(t), where (VR) is the speed the target is moving away from the SODS sensor in a radial direction ; and (t) is time, to determine if the value VR is increasing in value. If the value of VR is increasing, as determined by the blockage detection processor 13, and exceeds a predetermined threshold, the present blocked condition of the SODS 10 is nullified. The nullification of the blocked condition of the SODS 10, in response to the value of VR exceeding the predetermined threshold, indicates that the range or distance to the object or matter 12, which caused the blocked condition of the SODS 10, is moving away relative to the automobile 2 carrying the SODS 10. The above described analysis of the value VR, further minimizes false alerts communicated to the user of the automobile 2 by the blockage detection processor 13 and provides doppler capability to discriminate between a moving target and a stationary target.

Figure 9:
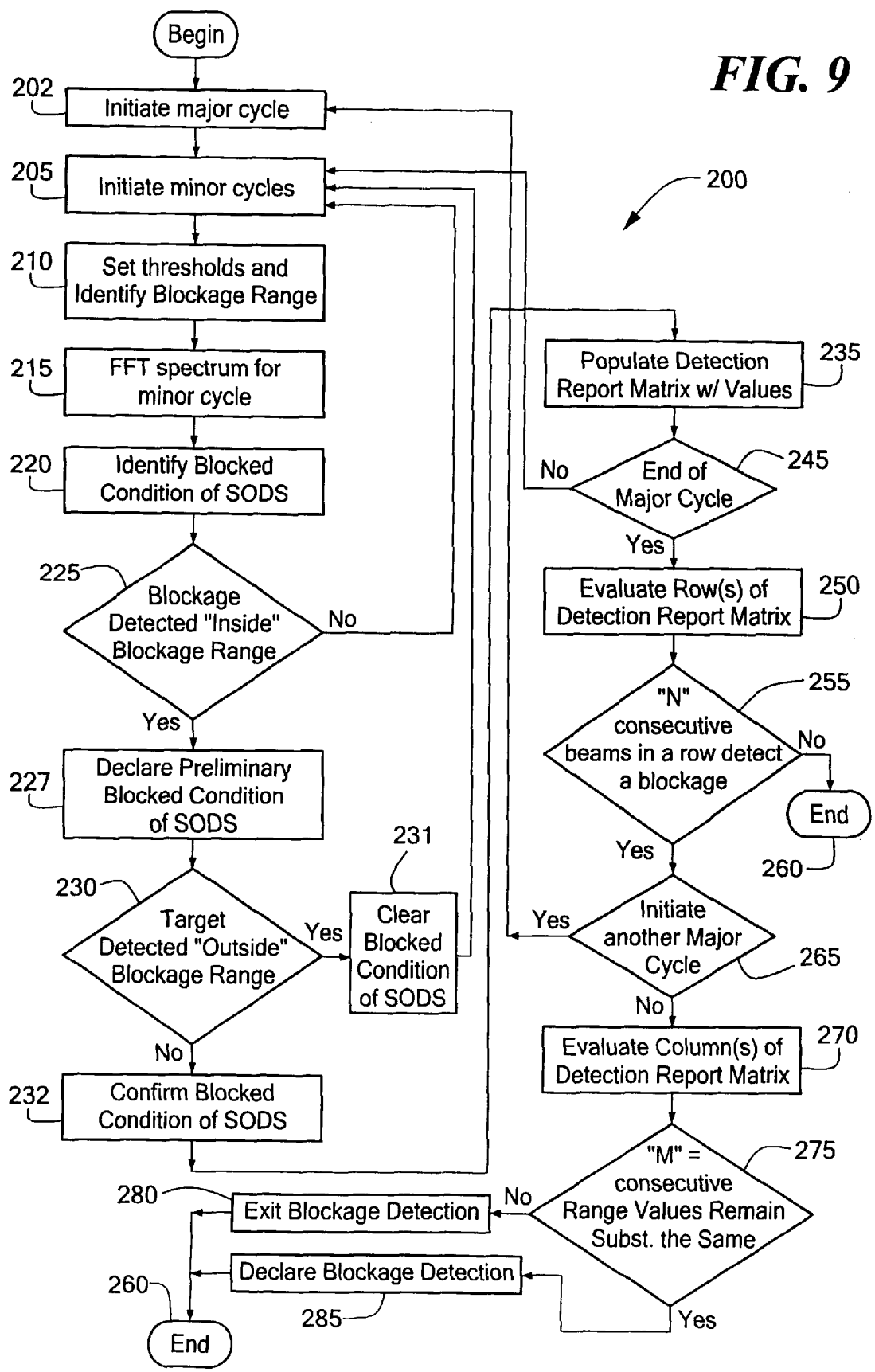
FIG. 9 is a flow chart illustrating exemplary process steps executable on the SODS of FIG. 4.

Referring to FIG. 9, an embodiment of a process for detecting a blocked condition of the SODS 10 is exemplified by the flow chart 200. The process for detecting a blocked condition of the SODS 10 may be carried out by the blockage detection processor 13 located on the DSP 30, as described above in connection with FIG. 4.

The process begins at step 202, in which a major cycle sweep is frequency is initiated in the SODS 10 and the first of a plurality of major cycles commenced. At step 205, the number of beams or minor cycles included in each major cycle is also initiated in the SODS 10 and the first of a plurality of minor cycles is commenced. Furthermore, the dimensions of the beams or minor cycles, which define the field of view or detection zone 14 are also initiated in the SODS 10. For example, the SODS 10 can be initiated to have a major cycle sweep frequency of approximately 20 KHz based on a 50 milli-second major cycle and a 1 milli-second minor cycle and the number of beams or minor cycles included in each major cycle can be initiated to seven, for example, such as the beams a–g of FIG. 2. Furthermore, the dimensions of the beams or minor cycles, which define the field of view or detection zone 14 can be initiated to approximately fifteen to approximately twenty degrees in beamwidth and approximately one hundred and fifty degrees in azimuth or sweep angle.

At step 210, a blockage detection threshold and a blockage range are set in the SODS 10. The blockage detection threshold can have similar characteristics as the curve F, as described above in detail with respect to FIGS. 5 and 6. The blockage range can be defined as a region bounded by the vertical asymptotes "H" and "I", as shown in FIGS. 5 and 6. The vertical asymptote "H" is located approximately on the surface of the SODS 10 and represents a blockage zero range (e.g. minimum frequency bin). The vertical asymptote "I" is located a predetermined distance from the surface of the SODS 10 and represents a blockage maximum range (e.g. maximum frequency bin).

At step 215, a plurality of digital signal samples are processed via an FFT to determine leakage signal content within various frequency ranges (i.e., frequency bins). The plurality of digital signal samples correspond to the data samples provided by sampling each of the frequency bins associated with each of the minor cycles (e.g. beams a–g of FIG. 2). The processing may be accomplished, for example, by the FFT processor 30a described above in connection with FIG. 4. The output of the FFT processor 30a can serve as an input to the blockage detection processor 13, as well as an input to the rest of the digital signal processor 30.

At step 220, an identification of a blocked condition of the SODS 10 and a corresponding range to the object, matter or target, which caused the blocked condition of the SODS 10, is determined by analyzing the leakage signal. In one embodiment, a target is identified by comparing the leakage signal level to stored leakage signal level patterns (e.g. the curves A–C, which correspond to the pattern recognition information, as discussed above with respect to FIG. 5). In this instance, if a characteristic of a measured leakage signal (e.g. signal level) substantially matches any one of curves A–C, the system provides an indication of a blockage detection (e.g. the blockage detection processor 13 provides a signal over output line 13d). In one embodiment, the indication can be provided as a detection flag (T), which indicates the presence of a blocked condition of the SODS 10 and a (T) value is populated into the detection report matrix 13e, as described above.

Additionally, a target and corresponding range can also be identified by comparing the leakage signal to the curve F & FF, which corresponds to the predetermined blockage threshold, as discussed above with respect to FIGS. 5 and 6. In this instance, if the leakage signal (e.g. signal level) exceeds the predetermined blockage threshold of curve F (FIG. 5) or the predetermined blockage threshold curve FF (FIG. 6), a blockage detection flag (T) value is provided by the blockage detection processor 13 and populated into the detection report matrix 13e.

In step 225 and with further reference to FIG. 5, a determination is made as to whether a blocked condition of the SODS 10 is detected "inside" of the blockage range, which blockage range is defined above as the region located between the "H" and "I" vertical asymptotes. A blocked condition of the SODS 10 can be detected "inside" of the blockage range by comparing the leakage signal "E" to the pattern recognition information curves "AC" to determine if characteristics of the leakage signal substantially match any one of the pattern recognition information curves "A–C". If a substantial match is detected between the leakage signal "E" and any one of the pattern recognition information curves "A–C", a preliminary blocked condition of the SODS 10 is declared, at step 227.

For example, the curve "G" can represent a leakage signal when the SODS is partially blocked by dirt, because the curve "G" may substantially match characteristics of the pattern recognition information curve "B", which is an expected curve when dirt substantially causes a blocked condition of the SODS 10. As a result, a preliminary blocked condition of the SODS 10 is declared, at step 227. It is important to note, that this blocked condition of the SODS 10, (e.g. dirt) is detected even though the curve "G" representing the leakage signal does not exceed the blockage threshold curve "F".

Similarly and with further reference to FIG. 6, a blocked condition of the SODS 10 can also be detected "inside" of the blockage range by comparing the leakage signal "GG" (e.g. signal level) to the blockage threshold curve "F". If it is determined that the leakage signal "GG" exceeds the blockage threshold curve "F" or drops below the blockage curve "FF", a preliminary blocked condition of the SODS 10 is declared, at step 227.

Further at step 225, if a blocked condition of the SODS 10 is not detected inside the blockage range, as described above, the above described steps 205–220 are repeated using another minor cycle or another beam a–g different from the beam a–g used in the previously described iteration. If it is determined at step 225, that a blockage condition of the SODS is located inside of the blockage range, as described above, then at step 230 a further determination is made as to whether a target is present outside the blockage range.

One or more targets can be detected outside of the blockage range, at step 230, by comparing one or more of the leakage signals "D", "E", or "F" (FIG. 5) or the leakage signal "GG" (FIG. 6) to each of their corresponding blockage threshold curve(s) "F". If it is determined that any one of the leakage signals "D", "E", or "F" exceed the blockage threshold curve "F" in a region outside of the blockage range, a target is declared as detected outside of the blockage range. As a result and at step 231, the preliminary blocked condition of the SODS 10, as declared in step 227, is cleared and the above described steps 205–230 repeated.

It is important to realize that the preliminary blocked condition of the SODS 10 is cleared, at step 231, because if the SODS 10 were in fact blocked, for example by dirt, then a target outside of the blockage range could not be detected. Since at step 231, a target is detected outside of the blockage range, the SODS 10 cannot be substantially blocked. The determination of a target outside of the blockage range, as conducted in step 230, significantly reduces false (T) values from being populated into the detection report matrix 13e. Further, reducing the number of false (T) values from being populated into the detection report matrix 13e also reduces false alerts from being issued to the user of the automobile 2.

Furthermore, if a target is not detected outside of the blockage range, at step 230, the preliminary blocked condition of the SODS 10 is confirmed as a blocked condition of the SODS 10, at step 232. As a result and at step 235, the detection report matrix 13e (FIG. 7), is populated with (T, R) values, which respectively indicate that a blocked condition of the SODS 10 has been detected and a corresponding range to the object that caused the blockage condition determined.

Thereafter, at step 245, a determination is made as to whether all of the minor cycles, which are represented by beams a–g (FIG. 2) have been processed for each major cycle. If it is determined that any of the minor cycles have not been processed, then the above described steps 205–235 are repeated until it is determined at step 245 that all of the minor cycles, which are represented by beams a–g (FIG. 2) have been processed for each major cycle.

At step 250, each major cycle defining each row of the detection report matrix 13e is evaluated. During evaluation of the detection report matrix 13e, at step 255, a determination is made as to whether at least "N" consecutive beams (e.g. minor cycles) of each major cycle include a (T, R) value representing a blocked condition of the SODS 10 within the blockage range. In an embodiment, N consecutive beams can be defined as five consecutive beams. If it is determined that less than N consecutive beams of each major cycle include a (T, R) value, at step 255, the method ends at step 260, because a blockage condition of the SODS 10 is inconclusive. If it is determined that N consecutive beams of each major cycle of the detection report matrix 13e include a (T, R) value, then at step 265 a further determination is made as to whether to initiate another major cycle. The initiation of another major cycle would result in the above described steps 202–255 being repeated and another row of values (e.g. T, R) may be added to the detection report matrix.

If it is determined not to initiate another major cycle, at step 265, the columns of the detection report matrix 13e are additionally evaluated, at step 270. Specifically, the columns each include a number of (T, R) values for which the "R" value represent a range to the object or matter that caused the blocked condition of the SODS 10. These "R" values included in each of the columns of detection report matrix 13e can be compared to each other to determined if the values are substantially equivalent with respect to each other, which indicates that the range to the object or matter is constant (e.g. object or matter is stationary). Further, the "R" values can also be compared to determine if there is a substantial difference in magnitude between the respective "R" values, which indicates that the range to the object or matter is variable (e.g. object or matter is moving).

At step 275, if it is determined that at least "M" of the "R" values located in at least five columns of the detection report matrix 13e remain substantially the same, then a blockage condition of the SODS 10 is declared at step 285 and the method ends at step 260. In an embodiment, M "R" values can be defined as five consecutive ranges values.

On the other hand, if less than at least M of the "R" values located in at least five columns of the detection report matrix 13e do not remain substantially the same, then the method ends at step 260 without declaring a blockage condition of the SODS 10. A blockage condition of the SODS 10 is not declared if the "R" range values are changing or not remaining substantially the same during subsequent major cycles, because this indicates the detected target or blockage is moving with respect to the SODS 10. As a result, the indication that the detected object or matter is moving, as described above, renders the declaration of a blockage condition of the SODS 10 inconclusive. Therefore, a blockage condition of the SODS 10 is not declared, as described above, in this circumstance.

The remaining components of the SODS 10 are further described hereinafter with reference again to FIG. 4. The volatile memory device 304 can include a random-access memory device (RAM) and can store a second look-up table containing a set of DSP output signals, or words in association with the frequency of the transmit signal 50 generated by the respective DSP output signal. This data is transferred to the volatile memory device 304 from Flash memory 156 during initial boot up of the system. This data may be corrected from time to time as a result of temperature effects as described herein.

The DSP 30 provides the digital ramp output signals, or words to the DAC 70, which converts the ramp words into respective analog signals. An analog smoothing circuit 76 is coupled to the output of the DAC 70 in order to smooth the stepped DAC output to provide the ramp control signal 86 to the VCO 92. In the illustrative embodiment, the VCO 92 is an SMV2488 device provided by Z Communications, Inc. of San Diego, Calif. and the VCO output signal 88 has a frequency in the range of 2.31 to 2.54 GHz.

An up-converter circuit 90 up-converts the VCO output signal 88 to a higher frequency, which may be desired for transmission via transmitter 22. In particular, the signal 88 is up-converted to a frequency of between 24.01 to 24.24 GHz. The up-converter 90 includes a 50 ohm load 136, an amplifier 138, a dielectric resonator (DR) 140, and a mixer 142. The amplifier 138, the dielectric resonator (DR) and the transmission lines 144, 146 form an oscillator circuit in which the DR 140 couples energy at its fundamental frequency and within its passband from transmission line 144 to transmission line 146 in order to generate an oscillator signal for coupling to mixer 142. In the illustrative embodiment, the oscillator signal on transmission line 144 has a nominal frequency of 21.7 GHz. The output of the mixer 142 is filtered by a bandpass filter 96 and is amplified by an amplifier 94. A portion of the output signal from amplifier 94, is coupled via coupler 95 to provide the transmit signal 50 for further amplification by amplifier 78 and transmission by transmitter antenna 18. Another portion of the output signal from amplifier 94 corresponds to a local oscillator (LO) signal 58 fed to an LO input port of a mixer 60 in the receive signal path.

The switch circuits 99, 101 are coupled to the transmit and receive antenna 16, 18 through a Butler matrix. The antennas 18, 16 and switch circuits 99, 101, and Butler matrix can be of the type described in U.S. patent application entitled Switched Beam Antenna Architecture, filed on Aug. 16, 2001, and assigned application Ser. No. 09/932,574 assigned to the assignee of the present invention, and incorporated herein by reference. Suffice it here to say that the switch circuits 99, 101 and Butler matrix operate to provide the antenna having a switched antenna beam with antenna beam characteristics which enhance the ability of the SODS 10 to detect targets.

The received signal 54 is processed by an RF low noise amplifier (LNA) 52, a bandpass filter 56, and another LNA 62, as shown. The output signal of the RF amplifier 62 is down-converted by a mixer 60, which receives a local oscillator signal 58, coupled from the transmitter, as shown. Illustrative frequencies for the RF signals from the amplifier 62 and the local oscillator signal 58 are on the order of 24 GHz. Although the illustrated receiver 24 is a direct conversion, homodyne receiver, other receiver topologies may be used in the SODS 10.

A video amplifier 64 amplifies and filters the down-converted signals, which, in the illustrative embodiment have a frequency between 1 KHz and 40 KHz. The video amplifier 64 may incorporate features, including temperature compensation, filtering of leakage signals, and sensitivity control based on frequency, as described in a co-pending U.S. Patent Application entitled Video Amplifier for Radar Receiver, and assigned application Ser. No. 09/930,867, filed on Aug. 16, 2001, assigned to the assignee of the present invention, and incorporated herein by reference.

The A/D converter 68 converts the analog output of the video amplifier 64 into digital signal samples for further processing. In particular, the digital signal samples are processed by a fast Fourier transform (FFT) 30a within the DSP 30 in order to determine the content of the return signal within various frequency ranges (i.e., frequency bins). The FFT outputs serve as data for the rest of the digital signal processor 30 in which one or more algorithms are implemented to detect objects within the field of view, which is described in commonly owned U.S. patent application Ser. No. 09/931,636, entitled RADAR TRANSMITTER CIRCUITRY AND TECHNIQUES, filed on Aug. 16, 2001, which is hereby incorporated by reference in its entirety.

The SODS 10 includes a temperature compensation feature with which temperature induced variations in the frequency of the transmit signal are compensated by adjusting the ramp signal 86 accordingly. For this purpose, the transmitter 22 includes a dielectric resonator (DR) 72 coupled to a microwave signal detector 74. The output of the microwave detector 74 is coupled to an analog-to-digital converter (not shown), which is included in the CAN controller 80 for processing by the DSP 30.

In operation, the DR 72 couples energy to the detector 74 only when the transmit signal 50 has a frequency within a range around the fundamental resonant frequency of the DR (i.e., within the passband of the DR). In the illustrative embodiment, the DR 72 has a fundamental frequency within the transmit frequency range and a passband which is relatively narrow compared with the transmit frequency range. In this illustrative embodiment the DR is provided having a passband on the order of 10 MHz centered in the middle of the band of operation of the system in order to provide sufficient frequency detection resolution as will become apparent. The detector 74 detects output power from the DR 72 and provides an electrical signal indicative of a predetermined level of output power from the DR.

Detection of output power from the DR 72 indicates transmission of the DR's fundamental predetermined frequency. Further, transmission of the predetermined frequency corresponds to a predetermined DSP output word which, in turn, corresponds to "an expected" transmission frequency as specified in the look-up table.

In operation, when the DSP 30 receives an output signal via the CAN controller 80 from the frequency detector 72 and 74 indicating transmission of the predetermined frequency, the expected frequency associated with the DSP output is compared to the predetermined frequency by a software comparator 82 within the DSP. The measured time of detection and the commanded frequency is correlated in order to make an accurate frequency measurement. Any discrepancy between the expected frequency and the measured frequency indicates that an adjustment to the DSP output is necessary. Stated differently, a difference between the two frequencies indicates that the look-up table data needs to be corrected, since the expected frequency is not being transmitted in response to the corresponding DSP output.

By way of a simple example, consider the case where the look-up table indicates that a DSP output of 11110000 corresponds to a transmit frequency of 24.20 GHz and the DR 72 has a fundamental frequency of 24.20 GHz. Thus, detection of output power from the DR 72 indicates that 24.20 GHz is being transmitted. However, assume further that the detection occurs when the DSP output is given by 11110001. This scenario indicates that the DSP output words need to be adjusted and, specifically, need to be shifted down by one, in order to transmit the desired, expected frequency.

Various techniques may be used to compensate for the error between the transmitted frequency and the expected frequency. As one example, an offset equal to the amount of the error (i.e., the difference between the transmitted frequency and the DSP output word that is stored in the look-up table in association with the DR's fundamental frequency) may be added or subtracted, depending on the direction of the offset, each time a new DSP output word is provided and until a new error is detected. Stated differently, each subsequent DSP output is simply shifted by the amount of the detected error. Since temperature generally does not change quickly, this error detection and correction may be performed relatively infrequently, such as once every 50 ms or 100 ms. It will be appreciated by those of ordinary skill in the art that other structures and techniques may be used for detecting the frequency of the transmit signal 50 to feedback to the DSP 30 for the purpose of adjusting the DSP output words in order to thereby adjust the frequency of the transmit signal.

Having described the preferred embodiments of the invention, it will now become apparent to one of ordinary skill in the art that other embodiments incorporating their concepts may be used. It is felt therefore that these embodiments should not be limited to disclosed embodiments but rather should be limited only by the spirit and scope of the appended claims. All publications and references cited herein are expressly incorporated herein by reference in their entirety.

What is claimed is:

1. A method for detecting antenna blockage in a radar system including a transmit antenna and a receive antenna, the method comprising:
   (a) sensing a first leakage signal communicated between the transmit and receive antennas;
   (b) comparing the energy level of the first leakage signal to at least one of a number of predetermined pattern recognition profiles.

2. The method of claim 1, further including:
   (c) determining if the first leakage signal substantially matches predetermined characteristics of any one of the number of predetermined pattern recognition profiles.

3. The method of claim 2, further including:
   (d) generating a first signal having a first value in response to the first leakage signal substantially matching the predetermined characteristics of any one of the number of predetermined pattern recognition profiles, and generating a second signal having a second value corresponding to an absence of antenna blockage in response to the first leakage signal not matching the predetermined characteristics of any one of the number of predetermined pattern recognition profiles.

4. The method of claim 3, further including:
   (e) determining if the energy level of the first leakage signal deviates from a predetermined leakage signal threshold level; and
   (f) generating the first signal if the first leakage signal deviates from the predetermined leakage signal threshold level and generating the second signal if the first leakage signal does not deviates from the leakage signal threshold level;
   (g) cyclically repeating steps (a)–(f) a predetermined number of times to generate a plurality of the first signals and a plurality of the second signals.

5. The method of claim 4, further including:
   (h) determining if a predetermined number of the first signals are present; and
   (i) generating an antenna blockage detection signal in response to the predetermined number of first signals being present.

6. The method of claim 5, wherein generating the antenna blockage signal further includes:
   generating a plurality of first values associated with each of the plurality of first signals and representing a presence of an antenna blockage; and
   generating a plurality of distance values associated with each of the plurality of first signals and representing a distance between the antenna and an object associated with the blockage.

7. The method of claim 6, wherein determining if a predetermined number of the first signals are present includes:
   sensing a velocity signal associated with relative motion of the antenna; and
   providing the antenna blockage detection flag if the plurality of distance values are substantially equivalent during the sensing of the velocity signal.

8. The method of claim 1, further including:
   (e) determining if the energy level of the first leakage signal deviates from a predetermined leakage signal threshold level; and
   (f) generating the first signal if the first leakage signal deviates from the predetermined leakage signal threshold level and generating the second signal if the first leakage signal does not deviates from the leakage signal threshold level.

9. The method of claim 1, wherein comparing the energy level of the first leakage signal to at least one of a number of predetermined pattern recognition profiles further includes:
   comparing the energy level of the first leakage signal to at least one of a number of predetermined pattern recognition profiles previously stored in a database, the predetermined pattern recognition profiles representing signatures associated with a plurality of different objects likely to block the antenna representing the antenna blockage.

10. The method of claim 1, wherein comparing the energy level of the first leakage signal to at least one of a number of predetermined pattern recognition profiles further includes:
    comparing the energy level of the first leakage signal to at least one reference leakage signal profile previously stored in a database, the reference leakage signal profile representing a leakage signature generated in the absence of antenna blockage.

11. A system for detecting blockage of a sensor which includes a transmitter and a receiver, the system comprising:
    a transmit antenna for transmitting a first RF signal through the transmit antenna;
    a receive antenna for receiving a second RF signal, said second RF signal comprising an RF signal reflection portion comprising signal reflections from objects within a field of view of the transmit antenna and a leakage portion comprising RF energy from said first RF signal; and
    a blockage detection processor coupled to said receiver, said blockage detection processor disposed to compare the leakage portion of the second RF signal with one or more predetermined pattern recognition profiles.

12. The system of claim 11, further including:
    a digital signal processor responsive to said second RF signal for computing a Fourier Transform of said second RF signal to provide a plurality of output signals, each one representative of energy content of said second RF signal within a corresponding range of frequencies, wherein a first one of said plurality of output signals is representative of the energy content of said second RF signal in a range of frequencies corresponding to approximately zero Doppler.

* * * * *

UNITED STATES PATENT AND TRADEMARK OFFICE
CERTIFICATE OF CORRECTION

PATENT NO. : 6,611,227 B1
DATED : August 26, 2003
INVENTOR(S) : Yonas Nebiyeloul-Kifle et al.

It is certified that error appears in the above-identified patent and that said Letters Patent is hereby corrected as shown below:

Column 1,
Line 16, delete "know" and replace with -- known --.
Line 18, delete "reliability" and replace with -- reliably --.

Column 2,
Line 1, delete "sue" and replace with -- due --.
Line 59, delete "generating" and replace with -- generates --.
Line 60, delete "deviates" and replace with -- deviate --.

Column 3,
Line 44, delete "principle" and replace with -- principles --.
Line 61, delete "levels" and replace with -- level --.
Line 64, delete "if values" and replace with -- of values --.

Column 4,
Line 35, delete "couples" and replace with -- coupled --.

Column 5,
Line 65, delete "a rate at" and replace with -- a rate of at --.

Column 6,
Line 60, delete "SOD system 10" and replace with -- SODS 10 --.

Column 7,
Lines 12 and 13, delete "SOD system 10" and replace with -- SODS 10 --.
Line 22, delete "CAN controller" and replace with -- CAN microcontroller --.

Column 8,
Lines 31, 34, 39 and 42, delete "define" and replace with -- defines --.

Column 9,
Line 9, delete "my" and replace with -- may --.
Line 37, delete "corresponding minor" and replace with -- corresponding to minor --.
Line 49, delete "corresponding seven" and replace with -- corresponding to seven --.
Line 57, delete "A"R" and replace with -- An "R" --.
Line 61, delete "A "F"" and replace with -- An "F" --.

Column 10,
Lines 43-44, delete "13e1".

UNITED STATES PATENT AND TRADEMARK OFFICE
CERTIFICATE OF CORRECTION

PATENT NO. : 6,611,227 B1
DATED : August 26, 2003
INVENTOR(S) : Yonas Nebiyeloul-Kifle et al.

It is certified that error appears in the above-identified patent and that said Letters Patent is hereby corrected as shown below:

Column 12,
Line 33, delete "AC" and replace with -- A-C --.

Column 13,
Line 65, delete "value" and replace with -- values --.

Column 14,
Line 1, delete "determined" and replace with -- determine --.

Column 17,
Line 6, delete "antennas" and replace with -- antennas; and --.
Line 28, delete ";and" and replace with -- ; --.
Line 32, delete "deviates" and replace with -- deviate --.
Line 33, delete "level;" and replace with -- level;and --.

Column 18,
Line 11, delete "deviates" and replace with -- deviate --.

Signed and Sealed this

Third Day of February, 2004

JON W. DUDAS
*Acting Director of the United States Patent and Trademark Office*